United States Patent [19]

Kuriyama

[11] Patent Number: 5,291,802
[45] Date of Patent: Mar. 8, 1994

[54] CONTROL SYSTEM FOR ENGINE AND AUTOMATIC TRANSMISSION

[75] Inventor: Minoru Kuriyama, Hiroshima, Japan

[73] Assignee: Mazda Motor Corporation, Hiroshima, Japan

[21] Appl. No.: 957,952

[22] Filed: Oct. 8, 1992

[30] Foreign Application Priority Data

Oct. 9, 1991 [JP] Japan .................. 3-262423

[51] Int. Cl.$^5$ ........................... B60K 41/00
[52] U.S. Cl. ........................... 74/858
[58] Field of Search ............. 74/851, 853, 854, 858, 74/872

[56] References Cited

U.S. PATENT DOCUMENTS

| 4,355,550 | 10/1982 | Will et al. | 74/872 |
| 4,403,527 | 9/1983 | Mohl et al. | 74/851 |
| 4,770,064 | 9/1988 | Kuerschner | 74/858 |
| 4,792,902 | 12/1988 | Hrovat et al. | 74/851 X |
| 4,800,781 | 1/1989 | Yasue et al. | 74/851 X |
| 5,038,287 | 8/1991 | Taniguchi et al. | 74/858 X |
| 5,168,776 | 12/1992 | Otsubo et al. | 74/858 |
| 5,188,005 | 2/1993 | Sankpal et al. | 74/851 X |

FOREIGN PATENT DOCUMENTS 55-46095 3/1980 Japan.

Primary Examiner—Dirk Wright
Attorney, Agent, or Firm—Fish & Richardson

[57] ABSTRACT

A control system for the engine and the automatic transmission of the automotive vehicle is arranged such that the torque of the engine is reduced by delaying the timing of ignition at the time of a shift of the automatic transmission with a multi-stage shift mechanism. The amount of the absorbed inertia at the time of the shift is computed as an amount corresponding to changes of the numbers of revolutions on the input side of the multi-stage shift mechanism prior to and subsequent to the shift thereof. The timing of ignition is so adapted as to be delayed in accordance with the amount of the resulting amount of the absorbed inertia. Preferably, the control amount for the torque to be reduced is computed in accordance with the torque of the engine at the time of the shift, and a control amount for the final torque to be reduced is given on the basis of the control amount for the torque to be reduced and the amount of the absorbed inertia, thereby delaying the timing of ignition in accordance with the control amount for the final torque to be reduced.

7 Claims, 6 Drawing Sheets

CONTROL SYSTEM FOR ENGINE AND AUTOMATIC TRANSMISSION

BACKGROUND OF THE INVENTION

1. Field of the Invention

The present invention relates to a control system for an engine and an automatic transmission for an automotive vehicle, so adapted as to reduce torque of the engine at the time of a shift of the automatic transmission.

2. Description of the Related Art

For instance, as disclosed in Japanese Patent Publication Laid-open (kokai) No. 55-46,095, it is known of a control system so adapted as to reduce torque of an engine by controlling the timing of ignition or the like, in order to suppress a torque shock from occurring due to a shift of a gear ratio at the time of a shift of the automatic transmission having a multi-stage shift mechanism.

Such a conventional control system for the engine and the automatic transmission is so arranged as to alter a shift stage in accordance with a variation in a running state of the vehicle to be determined by an angle of opening of a throttle valve, a vehicle speed or the like, on the basis of a shift map in which a shift line is predetermined. Further, such a control system is adapted to perform the control for reducing the torque of the engine at the time of a shift of the automatic transmission. The amount of the torque to be reduced is set on the basis of a map of the angle of opening of the throttle valve or the like in accordance with the shift map, and the map is so predetermined as to give an appropriate amount of the torque to be reduced at a constant shift point.

It can be noted that, for such a control system, a preset amount of the torque to be reduced becomes a value so adapted as to comply with a requirement for the amount of the torque reduced, if no shift point deviates and the absorbed inertia and the torque of the engine at the shift point is not varied due to an exterior factor, when the shift is performed. However, for instance, if the shift point is caused to deviate in accordance with changes of modes or other conditions, the amount of the absorbed inertia at the time of the shift is caused to vary in association with such changes, thereby causing a required amount of the torque reduced to vary, too. Hence, in these cases, the preset amount of the torque to be reduced may deviate from the required amount thereof, thereby impairing a feeling of the shift of the automatic transmission.

SUMMARY OF THE INVENTION

Therefore, the object of the present invention is to provide a control system for an engine and an automatic transmission so adapted as to reduce torque of the engine by an appropriate amount, even if an amount of absorbed inertia at the time of a shift of the automatic transmission is caused to vary due to changes of a shift point. Further, the present invention has another object to provide a control system therefor so adapted as to give a stable feeling of the shift of the automatic transmission even if the torque of the engine would change at the shift point.

In order to achieve the aforesaid objects, the present invention consists of a control system for an engine and an automatic transmission, comprising, as indicated by the solid line in FIG. 1, a torque adjusting means a for adjusting torque of the engine; and a control means b for controlling the torque adjusting means a so as to reduce the torque of the engine at the time of a shift of the automatic transmission having a multi-stage shift mechanism; wherein the control means b has an operational means c for computing an amount corresponding to an absorbed inertia on the basis of the detection of a factor relating to the absorbed inertia at the time of the shift of the automatic transmission; and an operational means d for setting a control amount for controlling the amount of the torque to be reduced in accordance with the absorbed inertia.

In accordance with this embodiment of the present invention, the torque of the engine can be adjusted in accordance with changes of the absorbed inertia at the time of the shift of the automatic transmission due to the fact that the shift point deviates or for other reasons, thereby providing an appropriate amount of the torque to be reduced relative to the absorbed inertia.

The present invention preferably consists of the control system in which the control means b further comprises, as indicated by the broken line in FIG. 1, an operational means e for computing an torque of the engine at the time of the shift of the automatic transmission; an operational means f for setting a control amount for controlling the torque of the engine to be reduced in accordance with the torque of the engine; and an operational means g for setting a control amount for controlling a final amount of the torque to be reduced on the basis of the control amounts determined by each of the operational means d and the operational means f.

In accordance with this embodiment of the present invention, the torque of the engine can be adjusted in accordance with changes of the torque of the engine, in addition to the absorbed inertia, at the time of the shift of the automatic transmission, thereby providing appropriate amounts for both of the torque to be reduced and the absorbed inertia.

With this arrangement, the operational means d and the operational means f give each a coefficient for their control amounts of the torque to be reduced, and the operational means g give a final amount for determining the final amount of the torque to be reduced by multiplying the both coefficients given by the operational means d and f, followed by multiplying the final control amount of the torque with the torque of the engine prior to the reduction of the torque.

On the other hand, the operational means c is preferably arranged so as to give a value corresponding to the absorbed inertia on the basis of the number of revolutions on the input side of the shift mechanism at the time of the shift of the automatic transmission. Further, the operational means c is preferably arranged so as for an amount of changes of the numbers of revolutions on the input side of the shift mechanism between prior to and subsequent to the shift of the automatic transmission to give a value corresponding to the absorbed inertia on the basis of a signal from the detection means for detecting the number of revolutions on the input side of the shift mechanism.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described more in detail with reference to the accompanying drawings.

Figure 1:
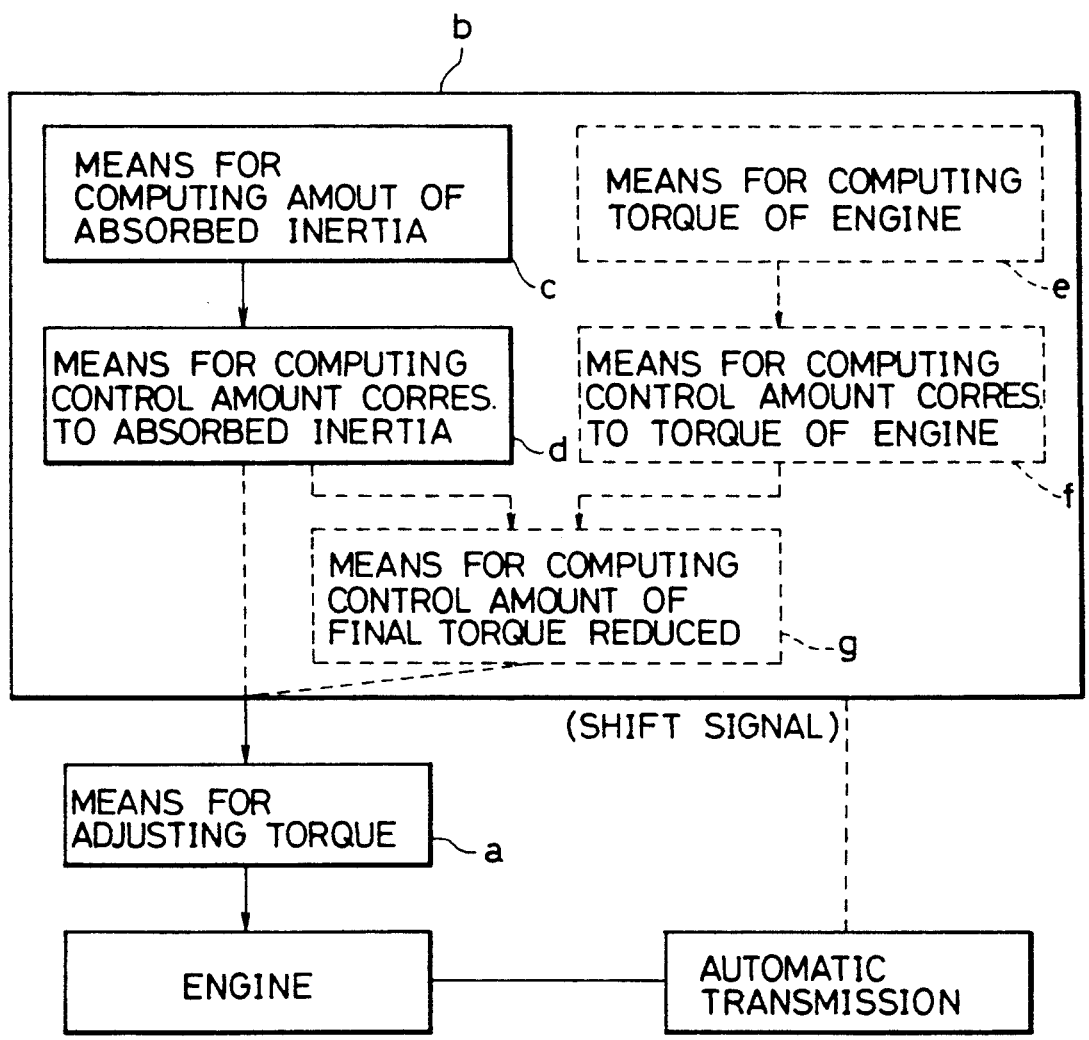
FIG. 1 is a block diagram showing an outline of the function of a control system according to an embodiment of the present invention.
Figure 2:
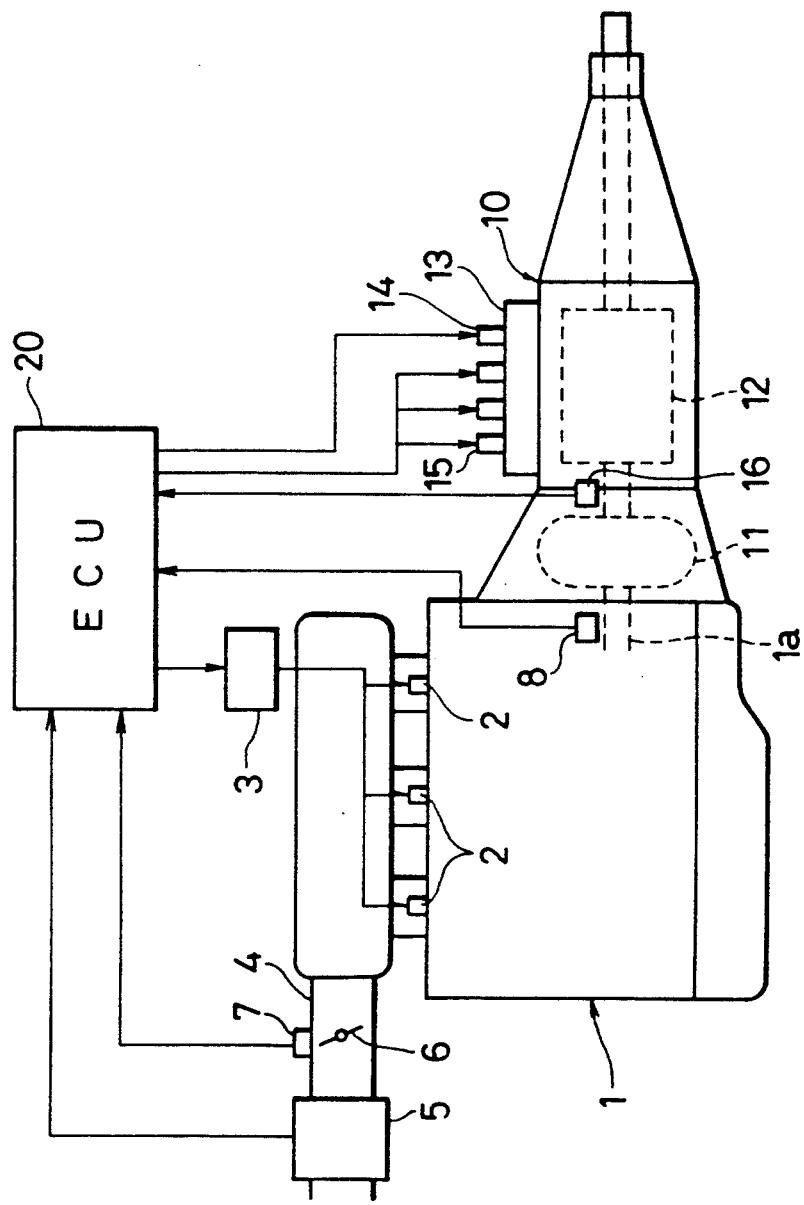
FIG. 2 is a schematic representation showing an outline of the control system according to an embodiment of the present invention.

As shown in FIG. 2, an body 1 of the engine is provided with a spark plug 2 for each cylinder. The spark plug 2 is connected to an ignition circuit 3 consisting of an ignition coil, a distributer or the like, and the ignition circuit 3 is so arranged as to be capable of changing the timing of ignition in response to a control signal. The ignition circuit 3 corresponds to the torque adjusting means a as shown in FIG. 1, and the torque of the engine can be adjusted by adjusting the timing of ignition.

The engine 1 is provided at its intake passage 4 with an air flowmeter 5 for detecting an amount of intake air to be inhaled into the engine 1 and a throttle valve 6 for adjusting the amount of the intake air in accordance with an operation by an accelerator. The throttle valve 6 is associated with a sensor 7 for sensing the angle of opening of the throttle valve and a sensor 8 for sensing the number of revolutions of the engine.

On the other hand, the automatic transmission 10 comprises a torque converter 11 connected to an output shaft 1a of the engine 1, a multi-stage shift mechanism 12 connected to an output side of the torque converter 11, and a hydraulic pressure control circuit 13 for controlling a supply of hydraulic pressure to a variety of friction coupling elements (not shown) contained in the shift mechanism 12 and the torque converter 11. The hydraulic pressure control circuit 13 has a duty solenoid valve 14 for controlling a line pressure in accordance with a control signal indicative of duty control, and a plurality of shift solenoid valves 15 for shifting a gear ratio (a shift stage) by shifting the state of supplying hydraulic pressure to the friction coupling elements of the shift mechanism 12 or discharging it therefrom in response to a control signal indicative of the control of the shift of the automatic transmission. On the other hand, the automatic transmission 10 is provided with a sensor 16 for sensing the number of revolutions of the turbine of the torque converter 11 corresponding to the number of revolutions thereof on the input side of the shift mechanism.

The signals detected by the air flowmeter 5 and the sensors 7, 8, and 16 are entered into a control unit (ECU) 20 consisting of a microcomputer composed of a CPU, a RAM, a ROM, and the like. The ECU 20 is so adapted as to perform the control for the line pressure of the hydraulic pressure control circuit 13 by generating a duty control signal to the duty solenoid valve 14 in accordance with the running state of the engine and to perform the control for the shift of the automatic transmission by generating the control signal to the shift solenoid valve 15 in accordance with the signal, for example, indicative of the angle of opening of the throttle valve and the number of revolutions of the turbine (or the vehicle speed). Furthermore, it performs the control for the timing of ignition by generating the control signal to the ignition circuit 3. In particular, the ECU 20 can achieve the function as the control means b containing the operational means c for computing the absorbed inertia, the operational means d for setting the control amount corresponding to the absorbed inertia, the operational means e for computing the torque of the engine, the operational means f for setting the control amount corresponding to the torque of the engine, and the operational means g for setting the final amount of the torque to be reduced, as shown in FIG. 1, by executing the control of the timing of ignition at the time of the shift of the automatic transmission in accordance with the program as indicated by the flowchart as shown in FIG. 3.

Figure 3:
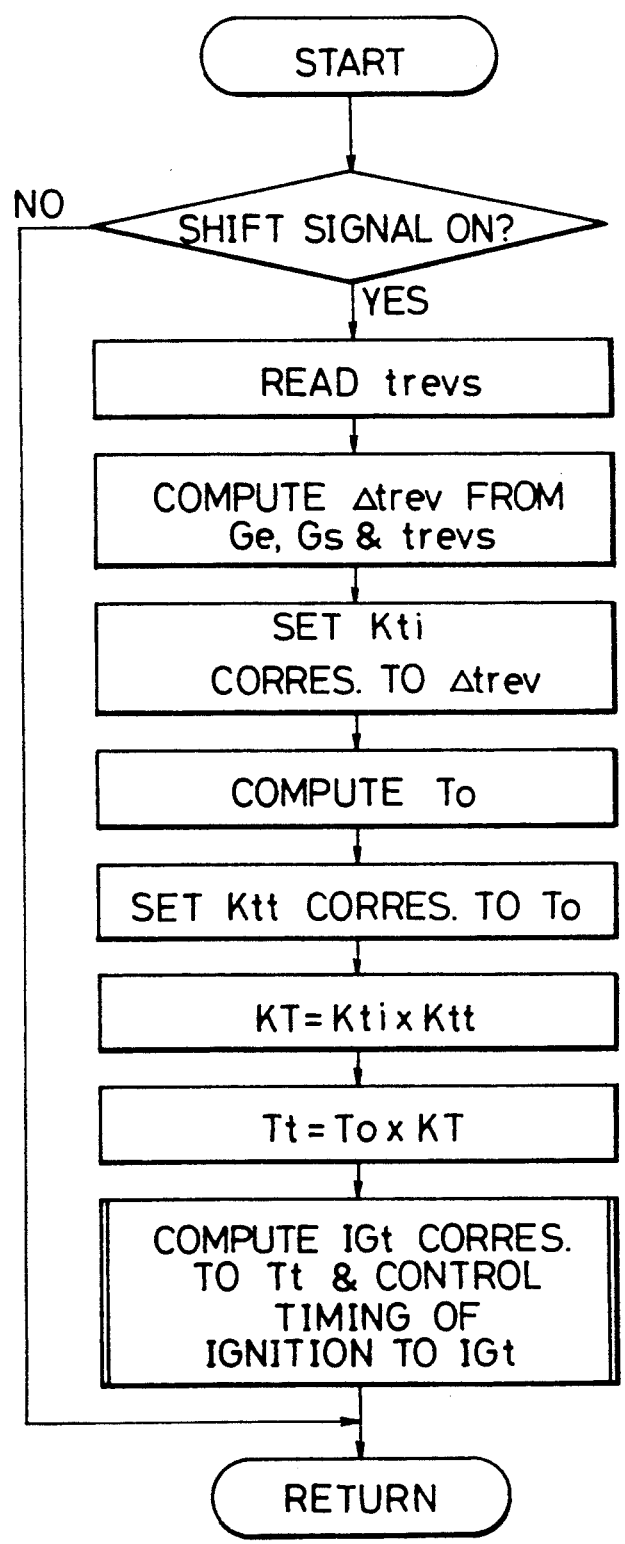
FIG. 3 is a flowchart showing a working example of the control system according to the present invention.

A description will now be made of the control of the timing of ignition to be performed by the ECU 20 at the time of the shift of the automatic transmission with reference to the flowchart as shown in FIG. 3.

First, at step S1, it is decided to determine if the automatic transmission is in the process of shifting by investigating if the shift signal is turned on. Whether the shift signal has been turned on is determined at the time when, in the shift control to be performed by the ECU 20 separately from the control of the timing of ignition, for example, the running state of the vehicle changes by crossing the shift line of the shift map.

If the result of decision at step S1 indicates that the shift signal is not turned on, the flow is returned without performing the control of reducing the torque of the engine.

On the other hand, when it is decided at step S1 that the shift signal is turned on, the control for reducing the torque of the engine is performed at the program flow from step S2 to step S9.

At step S2, the number of revolutions of the turbine, trevs, is read from the sensor for sensing the number of revolutions of the turbine at the time when the shift signal was turned on, followed by step S3 at which an amount of changes of the numbers of revolutions of the turbine between prior to and subsequent to the shift of the automatic transmission, $\Delta$trev, is computed by the following formula:

$$\Delta trev = |trevs \times (1 - Ge/Gs)|$$

where Ge is the target gear ratio of the shift; and
Gs is the gear ratio prior to the shift.

It can be noted herein that the amount of the changes of the numbers of revolutions of the turbine, $\Delta trev$, corresponds to the amount of the absorbed inertia and that steps S2 and S3 play the function of the operational means for computing the control amount corresponding to the absorbed inertia.

Figure 4A:
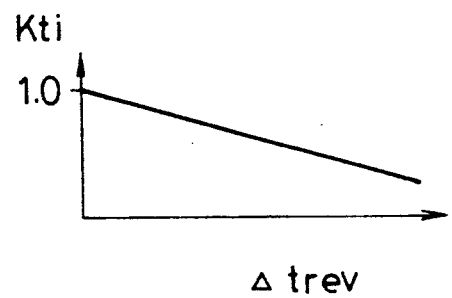
FIG. 4(a) is a graph showing the relationship of changes of the numbers of revolutions of the turbine with the coefficients of the torque reduced at the time of an up-shift.
Figure 4B:
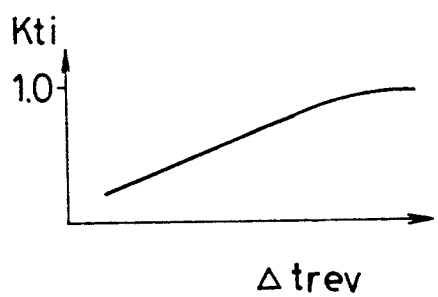
FIG. 4(b) is a graph showing the relationship of changes of the numbers of revolutions of the turbine with the coefficients of the torque reduced at the time of a down-shift.

Then, at step S4, a torque reducing coefficient, Kti, is set in accordance with the amount of changes of the number of revolutions of the turbine, $\Delta trev$, as the processing for fulfilling the function of the operational means for setting the control amount corresponding to the absorbed inertia. In this case, the torque reducing coefficient Kti is so set as to become smaller than 1.0 yet to decrease in proportion to an increase in the amount of changes of the number of revolutions of the turbine, $\Delta trev$, at the time of an up-shift of the automatic transmission, as shown in FIG. 4(a). On the other hand, the torque reducing coefficient, Kti, is so set as to become smaller than 1.0 yet to increase in proportion to an increase in the amount of changes of the number of revolutions of the turbine, $\Delta trev$, at the time of a downshift thereof, as shown in FIG. 4(b). This relationship of the amount of changes of the number of revolutions of the turbine, $\Delta trev$, with the torque reducing coefficient, Kti, is stored as a table in the ROM of the ECU 20. Hence, after the shift of the automatic transmission is determined if it is an up-shift or a down-shift, the table is selected and the torque reducing coefficient, Kti, is read from the selected table in accordance with the amount of changes of the number of revolutions of the turbine, $\Delta trev$.

Then, at step S5, a torque of the engine, To, is computed at the time when the shift signal was turned on, as the processing for fulfilling the operational means for computing the torque of the engine. A description will be made of an example of the operation for the torque of the engine. A torque of the engine, T, can be approximated as a functional equation for the timing of ignition, which follows:

$$T = -A(IG - B)^2 + C$$

where A, B, and C are each a coefficient that varies with the running state of the engine 1; and
IG is the timing of ignition.

It is to be noted herein that the coefficients A, B, and C are preset each as a map that is prepared by using the number of revolutions of the engine, NE, and an air filling efficiency, CE, as parameters. At step S5, the current air filling efficiency, CE, is given from the number of revolutions of the engine and the amount of intake air, and coefficients A1, B1, and C1 are given in accordance with the currently running state from each of the maps, on the basis of the air filling efficiency, CE1, and the current number of revolutions of the engine, NE1. Then, the torque of the engine, To, is computed by substituting the coefficients A1, B1, and C1 as well as the current timing of ignition, IG1, for the coefficients A, B, and C as well as the timing of ignition, IG, respectively, of the formula described immediately hereinabove.

Figure 7:
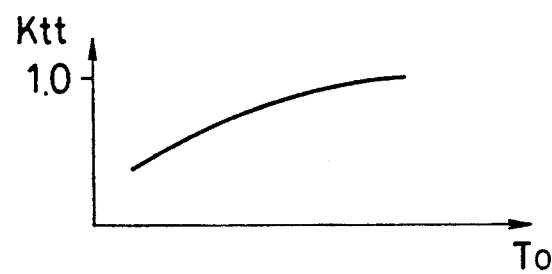
FIG. 7 is a graph showing the relationship of the torque of the engine with the coefficients of the torque reduced.

Then, at step S6, a torque reducing coefficient, Ktt, is set in accordance with the torque of the engine, To, as the processing for fulfilling the function of the operational means for setting the control amount corresponding to the torque of the engine. The torque reducing coefficient, Ktt, is so set as to become smaller than 1.0 yet to increase in proportion to an increase in the torque of the engine, To, as shown in FIG. 7. The relationship of the torque reducing coefficient, Ktt, with the torque of the engine, To, is preset and stored as a table in the ROM of the ECU 20, and the torque reducing coefficient, Ktt, is read in accordance with the torque of the engine, To, from the table.

Figure 5:
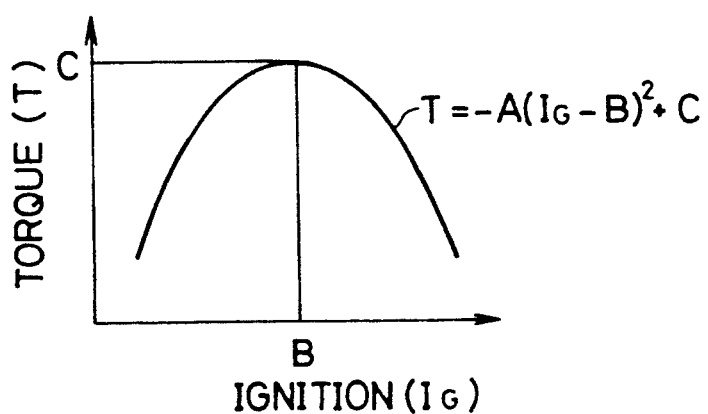
FIG. 5 is a graph showing the characteristic of the torque of the engine with the timing of ignition.
Figure 6A:
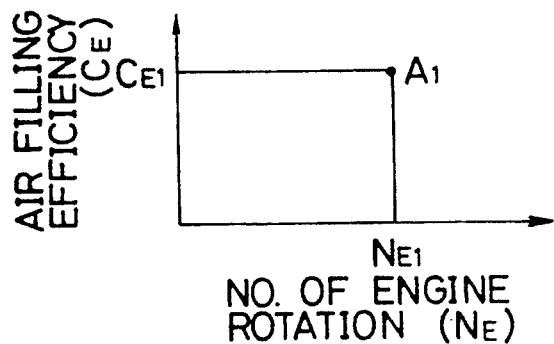
FIGS. 6(a), 6(b) and 6(c) are each a map for determining each of coefficients in the approximation formula of the torque of the engine.
Figure 6B:
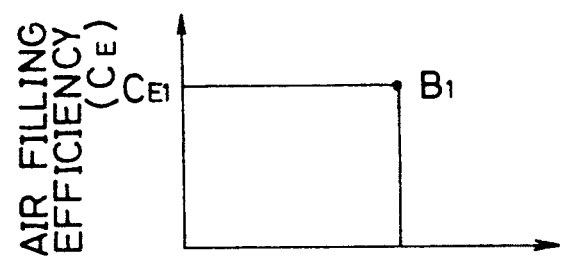
Figure 6C:
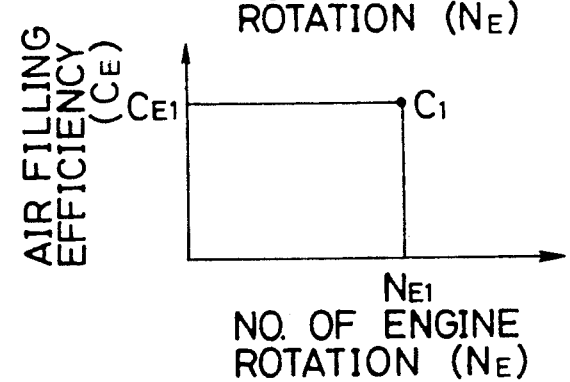

Further, at step S7, a final torque reducing coefficient, KT, is given by multiplying the torque reducing coefficient, Kti, with the torque reducing coefficient, Ktt, as the processing for fulfilling the function of the operational means for setting the control amount for determining the final amount of the torque to be reduced, followed by proceeding to step S8 at which the torque of the engine, To, at the time when the shift signal was turned on is multiplied with the final torque reducing coefficient, KT, thereby giving a target torque of the engine, Tt. Then, at step S9, the timing of ignition, IGt, is given at the time when the torque of the engine, T, became the target torque of the engine, Tt, on the basis of the functional equation, as shown in FIG. 5, given at the time of the processing at step S5. Further, at step S9, the timing of ignition, IGt, is computed, when T=Tt in the secondary function (FIG. 5) given at the processing at step S5, and the timing of ignition during the shift of the automatic transmission is so controlled as to reach the timing of ignition, IGt.

As described hereinabove, the control system according to the present invention can appropriately adjust the amount of the torque to be reduced, as shown in FIGS. 8(a), 8(b), 9(a), and 9(b), even if the absorbed inertia would change due to a deviation of the shift point at the time of the shift of the automatic transmission, or even if the torque of the engine would change.

Figure 8A:
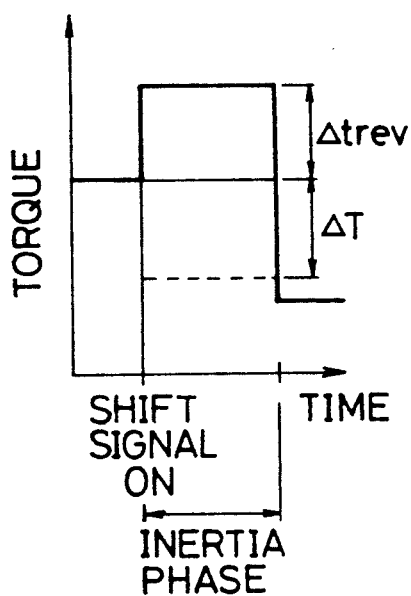
FIGS. 8(a) and 8(b) are each a graph showing the periodical relation of the torque of the engine when the absorbed inertia at the time of a shift of the automatic transmission is smaller and larger, respectively.
Figure 8B:
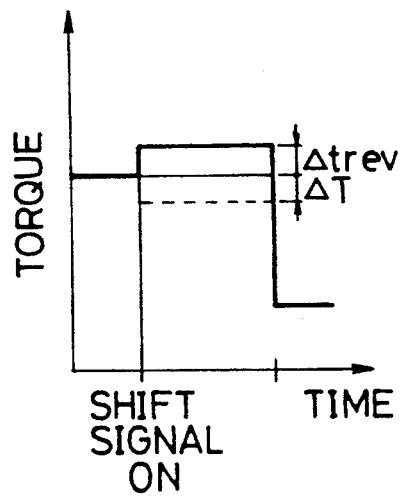

More specifically, on the one hand, the amount of the torque to be reduced, $\Delta T$, i.e. To−Tt, can be set to become larger by making the torque reducing coefficient, Kti, smaller when the amount of changes of the number of revolutions of the turbine, $\Delta trev$, corresponding to the absorbed inertia, is larger, as shown in FIG. 8(a), than when the amount of changes of the number of revolutions of the turbine, $\Delta trev$, corresponding to the absorbed inertia, is smaller, as shown in FIG. 8(b), because the required amount of the torque to be reduced becomes larger as the amount of the absorbed inertia becomes larger, when the torque of the engine is the same yet the amount of the absorbed inertia is different at the time of the up-shift of the automatic transmission.

Figure 9A:
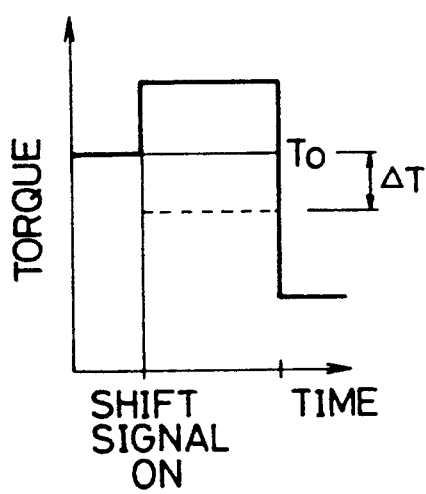
FIGS. 9(a) and 9(b) are each a graph showing the periodical relation of the torque of the engine when the torque of the engine at the time of the shift thereof is smaller and larger, respectively.
Figure 9B:
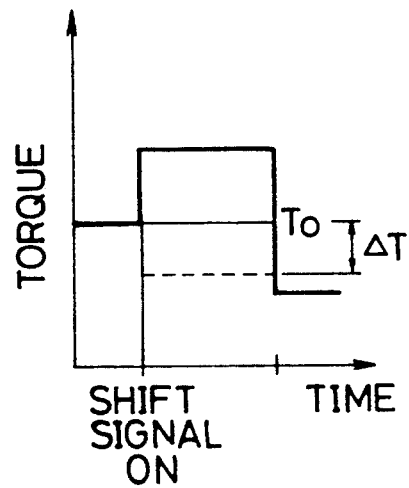

On the other hand, the amount of the torque to be reduced, $\Delta T$, that can comply with the requirements, can be ensured by making the torque reducing coefficient, Ktt, smaller when the torque of the engine, To, is smaller, as shown in FIG. 9(a), than when it is larger, as shown in FIG. 9(b), in order not to allow the amount of the torque reducing coefficient, $\Delta T$, to converge to its full extent as the torque of the engine, To, becomes smaller, when the absorbed inertia is the same yet the torque of the engine, To, is different.

It can be noted herein that a shift feeling can be improved to an extent better than conventional systems merely by reducing the torque at the time of the shift of the automatic transmission on the basis of the control amount (the torque reducing coefficient, Kti) in accordance with the amount of the absorbed inertia because the amount of the torque to be reduced can be adjusted relative to changes of the shift points or the like. It can be noted, however, that the control of the torque to be reduced can be adjusted in a more appropriate way by adjusting the amount of the torque to be reduced in accordance with both of the amount of the absorbed inertia and the torque of the engine, as in the embodiment according to the present invention.

It can be further noted herein that the amount corresponding to the amount of the absorbed inertia may be given on the basis of the number of revolutions on the input side of the shift mechanism, such as the amount of changes of the number of revolutions of the turbine, as in the embodiment according to the present invention. In this case, the number of revolutions of the engine may be employed as the number of revolutions on the input side of the shift mechanism, in place of the number of revolutions of the turbine.

In addition, it can be noted that the torque to be reduced at the time of the shift may be controlled by controlling the amount of fuel to be injected, as well as by controlling the timing of ignition.

As described hereinabove, the present invention can improve a feeling of the shift of the automatic transmission because the torque to be reduced can be adjusted in accordance with changes of the amounts of the absorbed inertia at the time of the shift due to a variation of the shift point or for other reasons, because the control system according to the present invention has the control means for reducing the torque at the time of the shift thereof, which contains the operational means for computing the amount corresponding to the amount of the absorbed inertia at the time of the shift thereof and the operational means for setting the control amount corresponding to the torque of the engine.

In addition, the control system according to the present invention can provide a stable feeling of the shift of the automatic transmission by adjusting the amount of the torque to be reduced in a more appropriate way in accordance with the amount of the absorbed inertia at the time of the shift thereof and the torque of the engine because the control system is provided with the control means for reducing the torque of the engine at the time of the shift thereof, which contains the operational means for computing the torque of the engine at the time of the shift thereof, the operational means for setting the control amount corresponding to the torque of the engine, and the operational means for setting the control amount corresponding to the final amount of the torque to be reduced on the basis of both of the control amounts, in addition to the operational means for computing the absorbed inertia and the operational means for setting the control amount corresponding to the absorbed inertia. In this instance, the processing for the operation of computing the torque to be reduced and the other processing can be implemented With ease by giving the coefficients for the control amount of the torque to be reduced in accordance with the amount corresponding to the amount of the absorbed inertia and the control amount of the torque to be reduced in accordance with the torque of the engine, multiplying the both coefficients, setting the product of the coefficients as the final control amount for the torque to be reduced, and then multiplying the final control amount with the torque of the engine prior to the reduction of the torque.

Furthermore, the control system according to the present invention can simplify a detecting system and the like by giving the amount corresponding to the amount of the absorbed inertia on the basis of the number of revolutions on the input side of the shift mechanism at the time of the shift of the automatic transmission.

The control system according to the present invention can further provide the amount of the absorbed inertia with ease and with high accuracy by giving the amount of changes of the number of revolutions on the input side of the shift mechanism prior to the shift thereof on the basis of the signal from the detection means for detecting the number of revolutions on the input side of the shift mechanism, as the amount corresponding to the amount of the absorbed inertia.

The present invention is not intended in any manner to be limited to the embodiments as described hereinabove, and it is to be understood that any variations or modifications made so as not to deviate from the basic concepts of the present invention are interpreted as being contained within the spirit and the scope of the present invention.

What is claimed is:

1. A control system for an engine and an automatic transmission for an automotive vehicle, having a torque adjusting means for adjusting torque of the engine and a control means for controlling said torque adjusting means so as to reduce the torque of the engine at the time of a shift of said automatic transmission with a multi-stage shift mechanism, wherein:

said control means comprises a first operational means for computing an amount corresponding to an amount of inertia absorbed during a shift of the automatic transmission, by detecting the rate of revolution of an input shaft of the shift mechanism prior to and subsequent to said shift; and a second operational means for setting a control amount for determining an amount of torque to be reduced when said shift occurs in accordance with the amount computed by said first operational means so as to reduce the torque more when the inertia is large than when the inertia is small.

2. A control system as claimed in claim 1, wherein said control system further comprises:

a third operational means for computing the torque of the engine at the time of said shift;

a fourth operational means for setting a control amount for determining the amount of torque to be reduced in accordance with the torque of the engine; and a fifth operational means for setting a final control amount for determining a final amount of torque to be reduced on the basis of said control amount determined by said second operational means and said control amount determined by said fourth operational means.

3. A control system as claimed in claim 2, wherein:

said second operational means gives a coefficient as a control amount for determining the torque to be reduced;

said fourth operational means gives a coefficient as a control amount for determining the torque to be reduced;

said fifth operational means sets said final control amount by multiplying said coefficient given by said second operational means with said coefficient given by said fourth operational means, and the target torque to be reduced is calculated by multiplying said final control amount with a torque of the engine prior to being reduced.

4. A control system as claimed in claim 1, wherein said first operational means computes said amount of absorbed inertia, on the basis of signals from a detection means for detecting the number of revolutions of an input shaft on the input side of the shift mechanism.

5. A control system as claimed in claim 3, wherein said torque adjusting means comprises a means for adjusting the timing of ignition.

6. A control system as claimed in claim 5, wherein said timing of ignition is computed by the following formula:

$$Tt = -A(IGt - B)^2 + C$$

where Tt is the target toque to be reduced, which is obtained by the operational means for setting the control amount for the final torque to be reduced;

IGt is the timing of ignition during the shift of the automatic transmission; and A, B, and C are each a coefficient set by using the number of revolutions of the engine and the air filling efficiency as parameters.

7. A control system as claimed in claim 1, wherein said automatic transmission further comprises a torque converter interposed between the engine and the shift mechanism and said input shaft of the shift mechanism is interposed between the torque converter and the shift mechanism.

* * * * *